United States Patent
Boone

(10) Patent No.: US 9,622,416 B2
(45) Date of Patent: Apr. 18, 2017

(54) AGRICULTURAL BALER WITH A PLUNGER SLOT COVER

(71) Applicant: CNH Industrial America LLC, New Holland, PA (US)

(72) Inventor: Wouter Boone, Ruiselede (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/610,721

(22) Filed: Jan. 30, 2015

(65) Prior Publication Data
US 2015/0208584 A1 Jul. 30, 2015

(30) Foreign Application Priority Data

Jan. 30, 2014 (BE) .................................. 2014/0052

(51) Int. Cl.
*A01F 15/04* (2006.01)
*B30B 9/30* (2006.01)

(52) U.S. Cl.
CPC .......... *A01F 15/042* (2013.01); *A01F 15/046* (2013.01); *B30B 9/3021* (2013.01)

(58) Field of Classification Search
CPC ...... A01F 15/042; A01F 15/046; A01F 21/00; A01F 15/044; A01D 75/187; A01D 75/18; B30B 9/3021
USPC ....... 100/179, 349, 350, 351, 352, 240, 245; 56/341, 343
See application file for complete search history.

(56) References Cited

U.S. PATENT DOCUMENTS 2,428,672 A * 10/1947 McClellan ............ B30B 9/3021
100/179
3,059,569 A * 10/1962 Nolt ........................ A01F 15/04
100/179
3,782,275 A * 1/1974 Webster ................ A01F 15/042
100/179

FOREIGN PATENT DOCUMENTS

| DE | 288309 B5 | 6/1995 |
|---|---|---|
| DE | 20314460 U1 | 1/2004 |
| GB | 748176 A | 4/1956 |
| GB | 773068 A | 4/1957 |

* cited by examiner

*Primary Examiner* — Jimmy T Nguyen
(74) *Attorney, Agent, or Firm* — Patrick M. Sheldrake

(57) ABSTRACT

An agricultural baler comprising a main bale chamber having a pair of opposed side walls. Each side wall includes a plunger slot arrangement defining a plunger slot. Each plunger slot has opposite ends and is open at both an inside adjacent to a plunger and an opposite outside. The plunger is reciprocally disposed within the main bale chamber, and includes a pair of opposed sides and at least one roller extending laterally outward from each side. Each roller is positioned within a respective plunger slot. The baler is characterized by a pair of plunger slot covers, with each cover only partially covering a respective outside of a corresponding plunger slot such that each end of the plunger slot is uncovered.

8 Claims, 5 Drawing Sheets

AGRICULTURAL BALER WITH A PLUNGER SLOT COVER

BACKGROUND OF THE INVENTION

This application claims foreign priority under 35 U.S.C. §119 to Belgian Application BE2014/0052 filed Jan. 30, 2014 titled "Agricultural Baler with a Plunger Slot Cover" and having Wouter Boone as the inventor. The full disclosure of BE2014/0052 is hereby incorporated herein by reference.

1. Field of the Invention

The present invention relates to agricultural balers, and, more particularly, to bale chambers within such balers.

2. Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

During the bale formation within the bale chamber, as described above, crop material can be forced through the plunger slots on opposite sides of the bale chamber. The crop material can accumulate outside of the bale chamber, such as in an area around the axle, or in an area between the twine box and the frame. It is thus necessary for the operator to periodically dismount from the traction unit and clean the crop from the baler. This takes time and effort on the part of the operator, reducing the baling efficiency of the baler.

German patent document DD 288 309 B5 discloses a baler with a plunger slot arrangement having a panel that carries an upper guide rail and lower guide rail. Plunger rollers run between the guide rails. The panel provides the structural framework for the plunger slot arrangement, and appears to be formed as an extrusion which is closed on the side opposite from the plunger. Since the panel provides the structural support for the plunger slot arrangement, and also appears to be formed as an extrusion, the outside closed wall apparently extends the full length of the plunger slot arrangement. Crop material would tend to accumulate within the plunger slot, which in turn could negatively affect the reciprocating movement of the plunger rollers within the plunger slot.

What is needed in the art is an agricultural baler which avoids problems of crop accumulation in areas outside of the bale chamber.

SUMMARY OF THE INVENTION

The present invention provides an agricultural baler with a plunger slot cover which partially covers an outside of a corresponding plunger slot, with each end of the plunger slot remaining uncovered.

The invention in one form is directed to an agricultural baler, including a main bale chamber having a pair of opposed side walls. Each side wall includes a plunger slot arrangement defining a plunger slot. Each plunger slot has opposite ends and is open at both an inside adjacent to a plunger and an opposite outside. The plunger is reciprocally disposed within the main bale chamber, and includes a pair of opposed sides and at least one roller extending laterally outward from each side. Each roller is positioned within a respective plunger slot. The baler is characterized by a pair of plunger slot covers, with each cover partially covering a respective outside of a corresponding plunger slot such that each end of the plunger slot is uncovered.

An advantage of the present invention is that crop material is inhibited from passing through the plunger slot and accumulating on the baler in an area outside of the main bale chamber.

Another advantage is that each cover only partially covers a corresponding plunger slot so that the plunger slot remains substantially free of crop material.

Yet another advantage is that by leaving both ends of the plunger slot uncovered, the rollers move air back and forth through the plunger slot and out the uncovered ends to keep the plunger slot substantially free of crop material.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
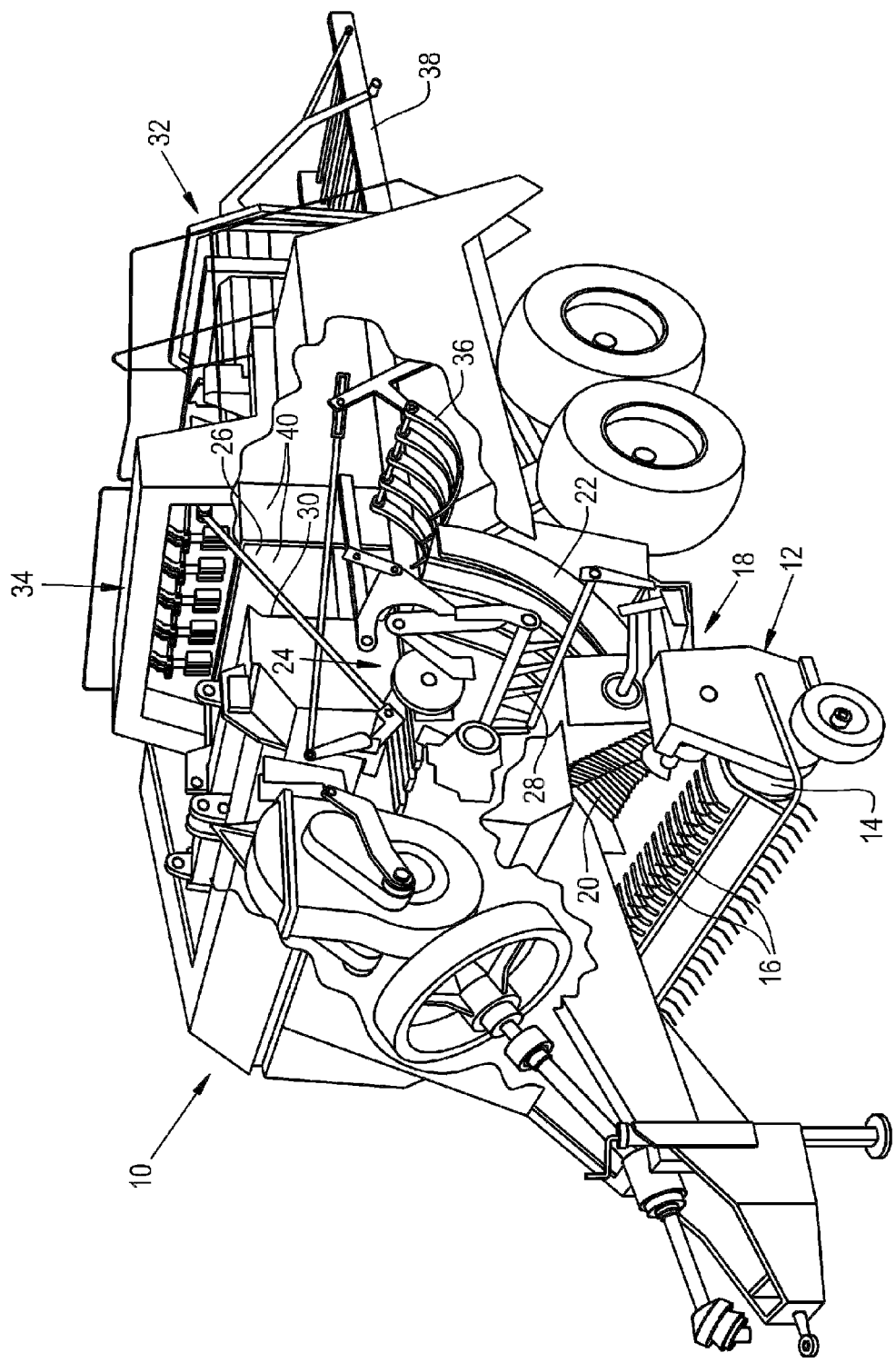
FIG. 1 is a perspective cutaway view showing the internal workings of a large square baler, which may include a main bale chamber with a plunger slot arrangement and plunger slot cover of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Figure 2:
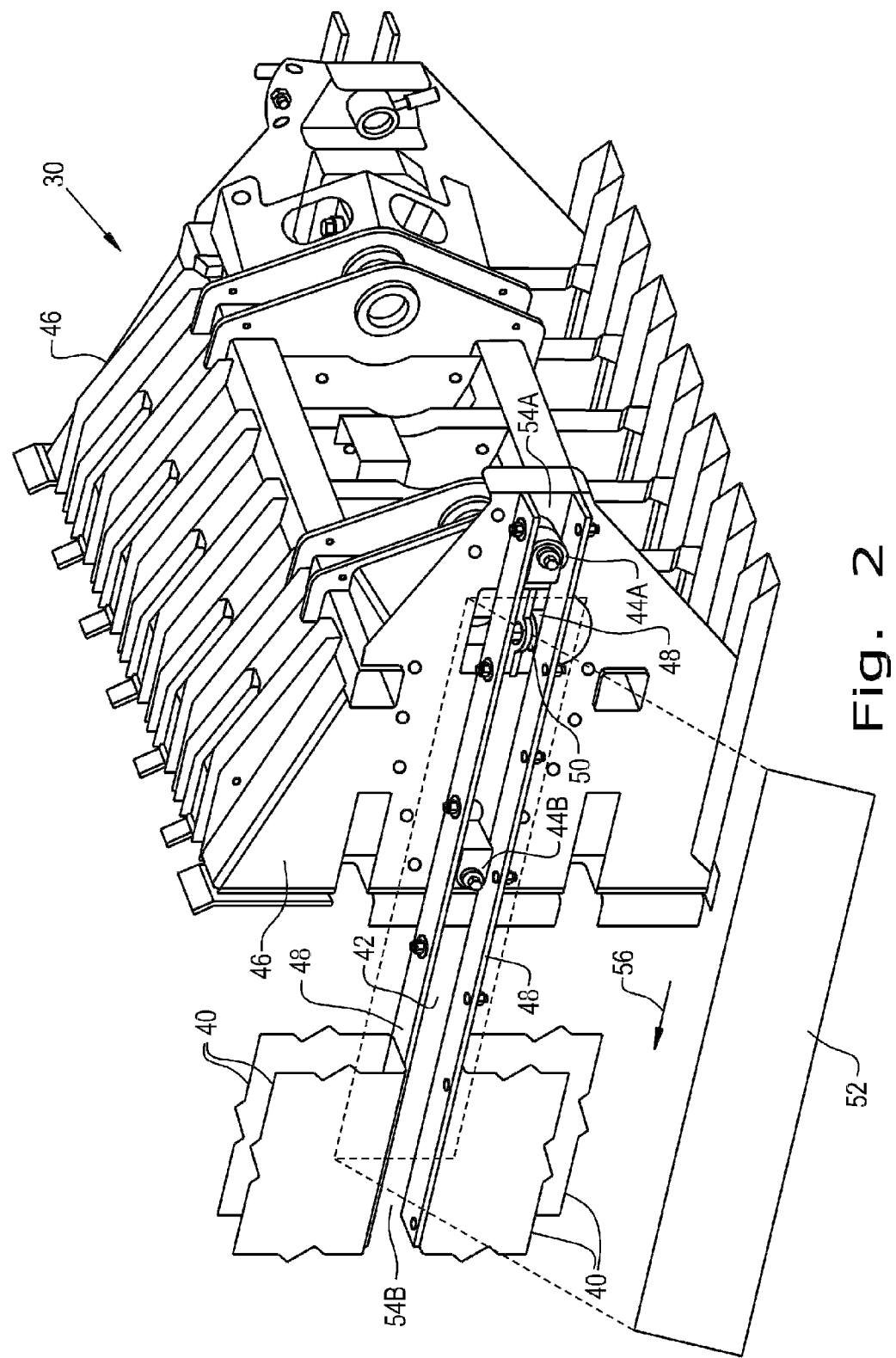
FIG. 2 is a fragmentary, partially exploded, perspective view of the main bale chamber shown in FIG. 1, including side walls defining a plunger slot arrangement and an embodiment of a plunger slot cover of the present invention.

Referring now to FIGS. 1 and 2, conjunctively, the main bale chamber 26 includes a pair of side walls 40, with each side wall 40 having a plunger slot 42 therein. Each plunger slot 42 has a longitudinal extension in the directions of reciprocating movement of the plunger 30, and supports the plunger 30 during the plunger strokes within the main bale chamber 26. Each plunger slot 42 is sized and configured to received one or more rollers 44 which extend laterally from each side 46 of the plunger 30. In the embodiment shown, a pair of substantially parallel rails 48 are attached to the side walls 40 and define the plunger slot 42. The plunger 30 is shown with first and second rollers, designated 44A and 44B, which travel within a corresponding plunger slot 42; however, the number of rollers 44 extending from each side 46 can vary. Further, the plunger 30 can have an additional roller 50 extending from each side 46 which rotates about a vertical axis and engages a lower rail 48 to limit side to side movement of the plunger 30 during compression strokes.

Figure 3:
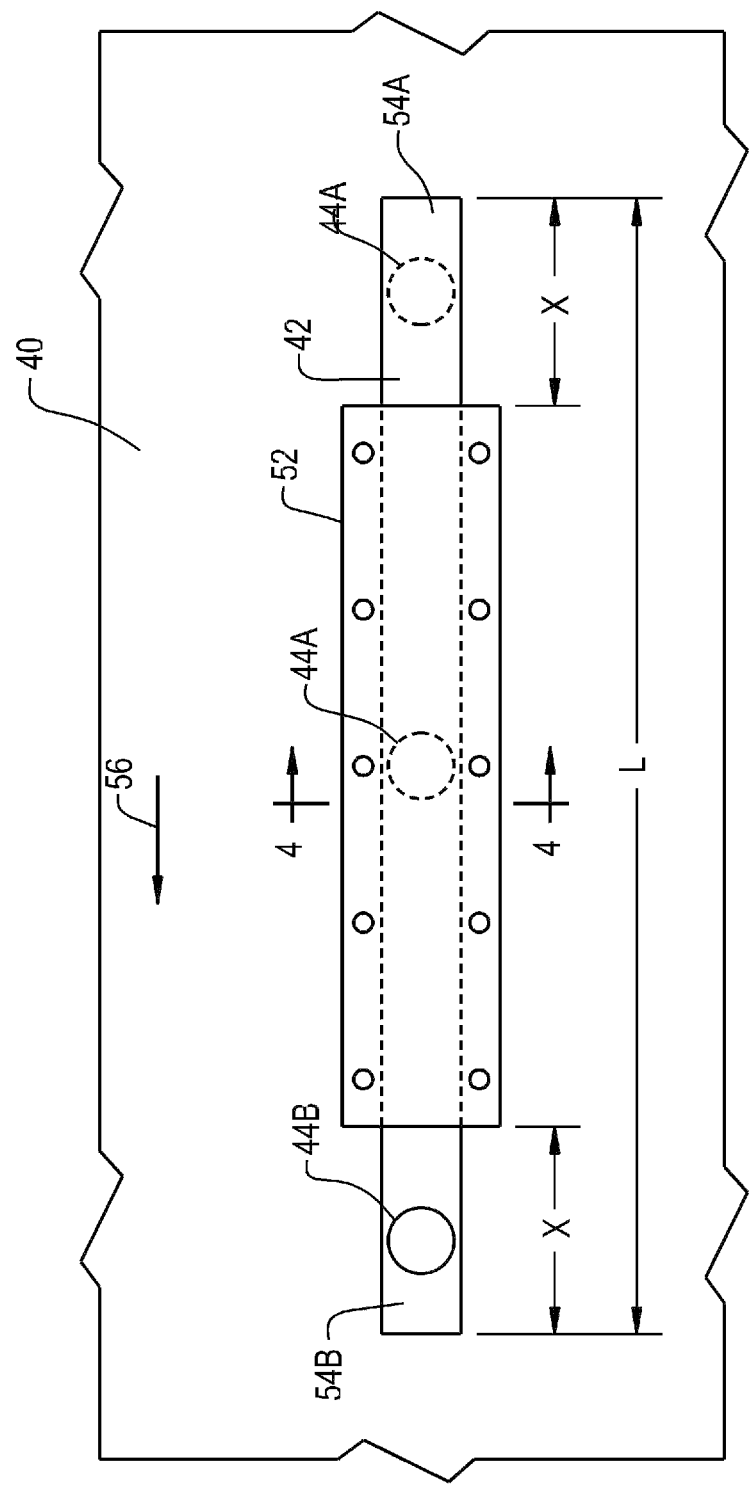
FIG. 3 is a side view of the main bale chamber shown in FIG. 2, with the plunger slot cover installed.

According to an aspect of the present invention, and referring now to FIGS. 2 and 3, each plunger slot 42 is partially covered with a cover 52 in a manner which inhibits crop from exiting the plunger slot 42, while at the same time inhibiting buildup of crop within the plunger slot 42. Cover 52 is shown attached in FIG. 3, and is shown detached in FIG. 2 with dashed lines to indicate the approximate attachment location. It will be appreciated that since the rollers 44 reciprocate back and forth within the plunger slot 42, it is necessary to locate the cover 52 on the outside of the plunger slot 42 (on the side opposite from the plunger 30). If the plunger slot 42 is entirely covered, then crop can build up within the plunger slot and inhibit the reciprocating movement of rollers 44 during compression strokes of plunger 30. To inhibit crop from exiting the plunger slot 42, and also inhibit crop buildup within the plunger slot 42, the cover 52 only partially covers a respective plunger slot 42 such that each end of the plunger slot 42 is uncovered.

More particularly, plunger slot 42 includes an upstream end 54A and a downstream end 54B, relative to a direction of bale movement within the main bale chamber 26, indicated by directional arrow 56. The plunger 30 reciprocates back and forth between a forward-most position (which is closest to the outlet 32), and an opposite rearward-most position. The first roller 44A is closest to the upstream end 54A and when the plunger 30 is at the rearward-most position, the portion of the plunger slot which is laterally adjacent to the first roller 44A (shown in dashed lines in FIG. 3, with the left position of roller 44A being hidden and the right position being an alternate position) is not covered with the cover 52. In this manner, a small amount of crop is allowed to exit the plunger slot 42 at the open upstream end 54A to inhibit buildup of crop material within the plunger slot 42. Likewise, the second roller 44B is closest to the downstream end 54B and when the plunger 30 is at the forward-most position, the portion of the plunger slot which is laterally adjacent to the second roller 44B is not covered with the cover 52. In this manner, a small amount of crop is allowed to exit the plunger slot 42 at the open downstream end 54B to inhibit buildup of crop material within the plunger slot 42.

One way of establishing the amount of the plunger slot 42 which is to remain uncovered at both the upstream end 54A and the downstream end 54B is by only covering a predetermined portion of a length (L) of the plunger slot 42. Referring to FIG. 3, the uncovered upstream end 54A and uncovered downstream end 54B are each shown as having a common uncovered length (X). The relationship between the uncovered length X and the overall length L can be expressed as X/L. For example, in one embodiment it is possible for the cover 52 to not cover approximately ¼ of the length L at the respective upstream end 54A and downstream end 54B. Of course, this ratio can vary from one baler to another and/or the ratio at each uncovered end can also vary relative to each other. Other methods of determining the amount of the plunger slot to remain open at each longitudinal end are also possible (e.g., using specific dimensions, or based on empirical data from testing, etc).

Figure 4:
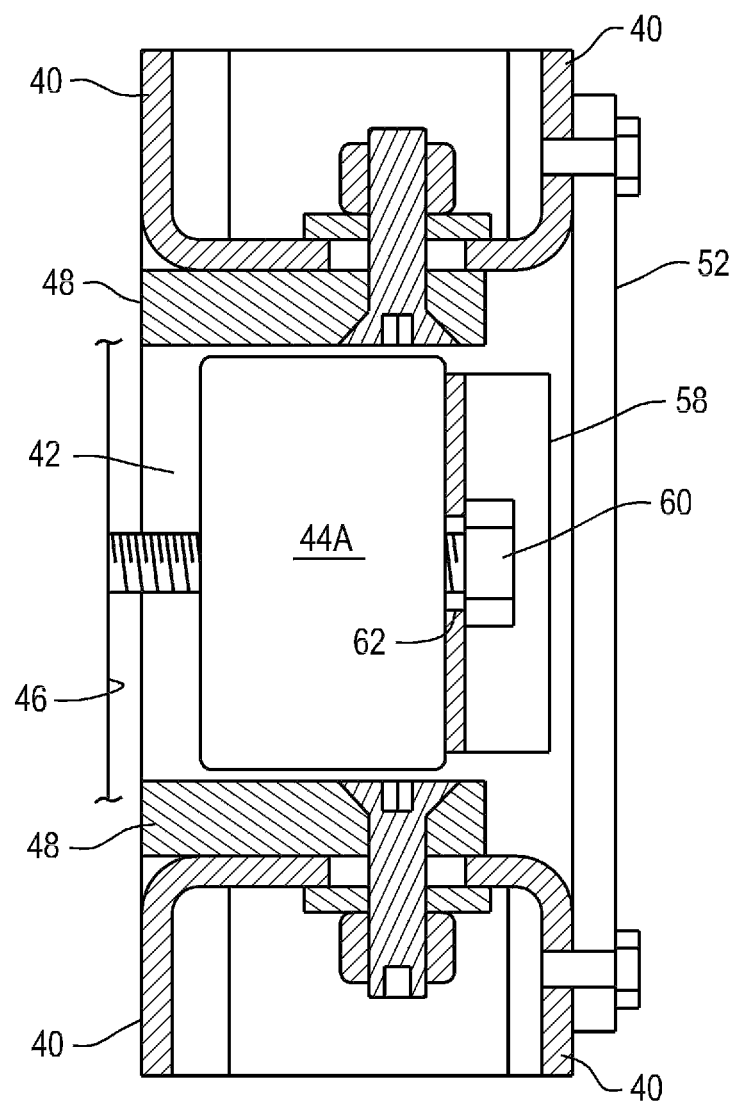
FIG. 4 is a sectional view of the plunger slot arrangement shown in FIGS. 2 and 3, taken along line 4-4 in FIG. 3, with an optional scraper attached to the roller assembly.
Figure 5:
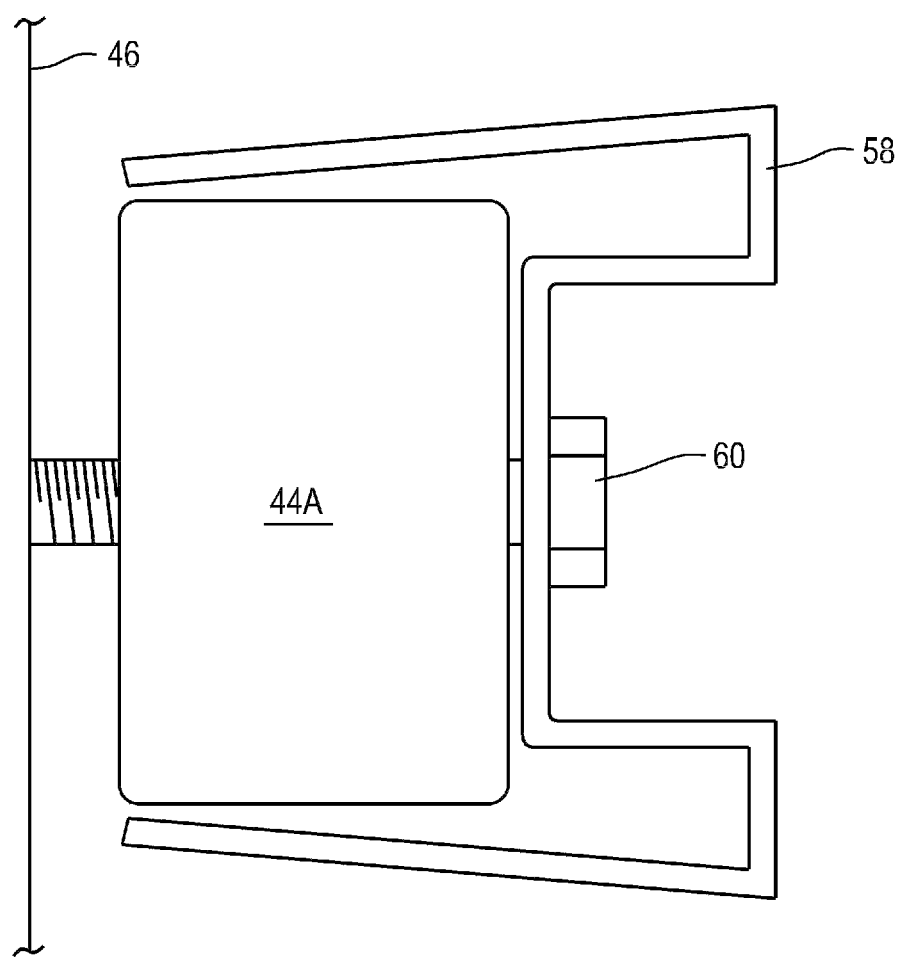
FIG. 5 is a top view of the roller assembly shown in FIG. 4.

Referring to FIGS. 4 and 5, each roller 44 can be provided with an optional scraper 58 which further assists with inhibiting a buildup of crop material within plunger slot 42. In the illustrated embodiment, scraper 58 is in the form of a generally W-shaped bracket (when viewed from the top in FIG. 5) which is mounted on the laterally outer side of roller 44A for movement with the roller 44A. Scraper 58 can include an opening 62 through which a bolt 60 passes which mounts the roller 44A to the lateral side 46 of plunger 30. In the illustrated embodiment, the opening 62 is configured as a slot allowing vertical adjustment of the scraper 58 within the plunger slot 42; however, the opening 62 can also be configured as a simple through hole. A bushing or the like (not specifically shown) can be used around the bolt 60 to provide a slight clearance or standoff distance between scraper 58 and the laterally outer side of roller 44A. For example, the bushing can extend between an inner race of the roller 44A and the laterally inner side of scraper 58. The scraper 58 can be positioned at a desired vertical location within the plunger slot 42, and then the bolt 60 is tightened. Preferably, the scraper 58 is positioned more closely adjacent to the bottom rail 48 rather than the top rail 48 of the plunger slot 42. The scraper 58 shown in FIGS. 4 and 5 is just one example of a scraper which effectively removes crop material as the rollers 44 move back and forth within plunger slot 42, and it will be appreciated that other configurations for the scraper are also possible.

In the embodiment illustrated in the drawings, cover 52 is formed from a metal plate. However, cover 52 can be formed from a different type of suitable material such as plastic, rubber, etc.

During operation of baler 10, plunger 30 reciprocates back and forth during compression strokes within the main bale chamber 26. As the plunger 30 reciprocates back and forth, the rollers 44 likewise reciprocate back and forth within a respective plunger slot 42. The movement of the rollers 44 causes a movement of air within the plunger slot 42 which acts to blow out or remove the crop material from the plunger slot 42. The optional scraper 58 also mechanically removes crop from within plunger slot 42, and further causes air movement within the plunger slot 42 for removal of the crop material. The cover 52 only partially covers a respective plunger slot 42 such that each end of the plunger slot 42 is uncovered, and thereby inhibits crop from exiting the plunger slot 42, and also inhibits crop buildup within the plunger slot 42.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
a main bale chamber including a pair of opposed side walls, each said side wall including a plunger slot arrangement having an upper and lower guide member having lengths oriented relative to a direction of movement of a bale within the main bale chamber, the upper and lower guide members defining a plunger slot therebetween, each said plunger slot being open at both an inside adjacent to a plunger and an opposite outside;
the plunger reciprocally disposed within said main bale chamber, said plunger including a pair of opposed sides and at least one roller extending laterally outward from each said side, each said roller being positioned within a respective said plunger slot between the upper and lower guide members; and
a pair of plunger slot covers, each said cover attached over a respective said outside of corresponding plunger slot and having a length less than the length of the corresponding guide members such that the plunger slot covers only partially cover said respective said outside of a corresponding said plunger slot, wherein the at least one rollers extending from the opposing sides of the plunger are located in uncovered portions of the plunger slots beyond the lengths of the covers when the plunger is in an end position of travel.

2. The agricultural baler of claim 1, wherein each said plunger slot has an upstream end and a downstream end, relative to a direction of movement of a bale within the main bale chamber, and each said cover does not cover a respective said downstream end of a corresponding said plunger slot.

3. The agricultural baler of claim 2, wherein each said plunger slot has a length, and each said cover does not cover a predetermined portion of said length at a respective said downstream end, wherein the uncovered predetermined portion forms a passage for air flow.

4. The agricultural baler of claim 3, wherein each said cover does not cover approximately ¼ of said length at a respective said downstream end.

5. The agricultural baler of claim 1, wherein each said plunger slot has an upstream end and a downstream end, relative to a direction of movement of a bale within the main bale chamber, and each said cover does not cover a respective said upstream end of a corresponding said plunger slot, wherein said uncovered portions form passages for air flow.

6. The agricultural baler of claim 5, wherein each said plunger slot has a length, and each said cover does not cover a predetermined percentage of said length at a respective said upstream end.

7. The agricultural baler of claim 6, wherein each said cover does not cover approximately ¼ of said length at a respective said upstream end.

8. The agricultural baler of claim 1, wherein each said cover does not cover a respective upstream end and downstream end of a corresponding said plunger slot.

* * * * *